United States Patent [19]

Anderson et al.

[11] Patent Number: 5,354,508

[45] Date of Patent: Oct. 11, 1994

[54] ORGANOTIN STABILIZER MIXTURE

[75] Inventors: Donald F. Anderson, Ossining, N.Y.; Steven Walter, Mt. Laurel, N.J.

[73] Assignee: Akzo Nobel N.V., Arnhem, Netherlands

[21] Appl. No.: 160,534

[22] Filed: Dec. 1, 1993

[51] Int. Cl.$^5$ ............................................. C08K 5/58
[52] U.S. Cl. ................................. 252/400.1; 556/88; 556/91; 556/92; 556/93
[58] Field of Search .............. 252/400.1; 556/88, 91, 556/92, 93

[56] References Cited

U.S. PATENT DOCUMENTS

| | | | |
|---|---|---|---|
| 2,641,596 | 6/1953 | Leistner | 556/88 |
| 2,727,917 | 12/1955 | Mack et al. | 556/88 |
| 2,789,963 | 4/1957 | Hecker | 524/180 |
| 2,832,751 | 4/1958 | Wetnberg et al. | 260/45.75 |
| 2,832,752 | 4/1958 | Weinberg et al. | 556/88 |
| 2,870,119 | 1/1959 | Leistner et al. | 524/180 |
| 3,502,616 | 3/1970 | Stapfer | 260/45.75 |
| 3,530,157 | 9/1970 | Hoch | 556/88 |
| 3,632,538 | 1/1972 | Kauder | 260/23 X |
| 3,803,083 | 4/1974 | Brecker | 260/45.75 R |
| 3,865,787 | 2/1975 | Ludwig et al. | 260/45.75 S |
| 3,919,168 | 11/1975 | Dieckmann | 260/45.75 S |
| 3,969,319 | 7/1976 | Hutton et al. | 260/45.75 S |
| 4,043,949 | 8/1977 | Treadwell et al. | 521/121 |
| 4,059,562 | 11/1977 | Hoch et al. | 524/145 |
| 4,104,292 | 8/1978 | Dworkin et al. | 260/429.7 |
| 4,115,352 | 9/1978 | Bohen et al. | 260/45.75 B |
| 4,179,432 | 12/1979 | Molt | 260/45.75 S |
| 4,255,320 | 3/1981 | Brecker et al. | 260/45.75 |
| 4,315,850 | 2/1982 | Kugele | 524/181 |
| 4,331,587 | 5/1982 | Jennings et al. | 524/181 |
| 4,810,736 | 3/1989 | Hyde | 252/400.1 |
| 4,839,409 | 6/1989 | Conroy | 252/400.1 |

FOREIGN PATENT DOCUMENTS

| | | |
|---|---|---|
| 512208 | 4/1955 | Canada . |
| 525591 | 5/1956 | Canada . |
| 588883 | 12/1959 | Canada . |
| 792308 | 3/1958 | United Kingdom . |

OTHER PUBLICATIONS

Derwent Patent Abstract 09227B/05 (of JP 53/146751 (Dec. 1978).
Derwent Patent Abstract 84-174007/28 (of JP 59/96,150 (Jun. 1984).
Derwent Patent Abstract 81 770x/44 (of JP 60/ 75,643 (Jun. 1975).

*Primary Examiner*—Robert L. Stoll
*Assistant Examiner*—Valerie Denise Fee
*Attorney, Agent, or Firm*—Louis A. Morris; Richard P. Fennelly

[57] ABSTRACT

An organotin stabilizer mixture comprising: (a) monoalkyltin mercaptoalcohol (b) a monoalkyltin mercaptoacid ester; and (c) a monoalkyltin sulfide provides improved early color, lubricity, and weatherability to rigid vinyl polymer formulations. The formulation may also contain a monoalkyltin mercaptoalcohol ester as an optional component.

12 Claims, No Drawings

ORGANOTIN STABILIZER MIXTURE

BACKGROUND OF THE INVENTION

The present invention relates to an organotin stabilizer mixture, suitable for use in rigid vinyl polymer formulations, which combines several positive and beneficial properties into a single stabilizer composition. The stabilizer formulation provides improved early color, lubricity, and weatherability.

A wide variety of organotin containing stabilizer formulations are known to persons of ordinary skill in the art for use in a variety of polymer compositions including rigid vinyl formulations. Some examples of organotin formulations which are deemed generally relevant to the present invention include the following:

O. S. Kauder U.S. Pat. No. 3,632,538 shows the use of an organotin alpha- or beta-mercapto carboxylic acid ester and an organotin sulfide in PVC resin formulations.

R. D. Dworkin et al U.S. Pat. No. 4,104,292 discloses organotin derivatives of mercaptoalcohol esters.

J. M. Bohen et al. U.S. Pat. No. 4,115,352 illustrates mixtures of alkali and alkaline earth metal salts of mercaptans or mercapto acids with specified sulfur containing organotin or antimony compounds as heat stabilizers for halogenated resins.

L. R. Brecker et al. U.S. Pat. No. 4,255,320 illustrates stabilizer mixtures comprising a monoalkyl 2-acyloxyethylmercaptide and/or a dialkyltin 2-acyloxyethylmercaptide in admixture with an alkyltin sulfide.

In general, two types of organotin stabilizers are in common usage in vinyl chloride polymer formulations: the mixed metal soap type; and tin stabilizers based on mixtures of monoalkyltin and dialkyltin stabilizer compounds. The monoalkyltin compounds generally give good color, whereas the dialkyltin compounds give good long term stability. The present invention relates to a monoalkyltin stabilizer mixture which is preferably adapted to be blended, in various desired ratios, with conventional dialkyltin stabilizer(s), such as the preferred dibutyltin stabilizer compound(s), for use in vinyl chloride polymer formulations.

SUMMARY OF THE INVENTION

The present invention, in one embodiment, is an organotin stabilizer mixture comprising:
(a) a monoalkyltin mercaptoalcohol;
(b) a monoalkyltin mercaptoacid ester; and
(c) a monoalkyltin sulfide.
An optional additional component is a monoalkyltin mercaptoalcohol ester.

DESCRIPTION OF PREFERRED EMBODIMENTS

In the compositions of the present invention the monoalkyltin mercaptoalcohol (a) is of the formula $RSn(SR'OH)_3$, where R is lower alkyl and R' is lower alkylene, R preferably being butyl and R' preferably being ethylene, namely, monobutyltin tris(betamercaptoethanol). Free betamercaptoethanol, for example, is frequently added to alkyltin stabilizers for crisp early color and clarity when processing vinyl chloride formulations. A major disadvantage of such a practice is the generation of a foul mercaptan odor. In the present invention this conventional component is replaced with a reaction product of the betamercaptoethanol, namely, the monoalkyltin mercaptoalcohol in order to alleviate the type of odor, corrosivity, and toxicity problems associated with the free betamercaptoalkanol species.

The monoalkyltin mercaptoacid ester component (b) is of the formula $RSn(SR'CO_2R'')_3$, where R is lower alkyl, R' is lower alkylene, and R" is $C_6$ to $C_{10}$ alkyl wherein R is preferably butyl, R' is preferably methylene, and R" is preferably isooctyl, namely monobutyltin tris(isooctylthioglycolate). This component imparts good long term stability and color hold to rigid vinyl chloride polymer formulations. It is relatively cheap.

Component (c) the monoalkyltin sulfide comprises monoloweralkyl, such as monobutyl with a preferred compound being monobutyltin sulfide. This component is used in the present formulation to boost the percent tin contained therein.

The above-described components of the stabilizer mixture of the present invention can be present in the following amounts:

(a) 10% to 20%, by weight of monoalkyltin mercaptoalcohol (a);
(b) 35% to 45%, by weight of monoalkyltin mercaptoacid ester (b); and
(c) 15% to 25%, by weight of monoalkyltin sulfide (c).

As an optional fourth component the stabilizer mixture of the present invention further comprises a monoalkyltin mercaptoalcohol ester which is of the formula $RSn(SR'O_2CR'')_3$, where R is lower alkyl, R' is lower alkylene, and R" is $C_{12}$ to $C_{20}$ alkyl, preferably where R is butyl, R' is ethylene, and R" is oleyl, namely monobutyltin tris(betamercaptoethyl-oleate). This component provides good early color, lubrication, and good long-term color hold.

When the stabilizer mixture comprises the optional monoalkyltin mercaptoalcohol ester it will have the following amounts of the four components listed below:

(a) 10% to 20%, by weight of monoalkyltin mercaptoalcohol (a);
(b) 15% to 25%, by weight of monoalkyltin mercaptoacid ester (b);
(c) 25% to 35%, by weight of monoalkyltin sulfide (c); and
(d) 30% to 40%, by weight of a monoalkyltin mercaptoalcohol ester.

The above-described embodiments of the present invention can be conveniently prepared by the reaction of an alkyltin trichloride (e.g., monobutyl tin trichloride) with a betamercaptoalkanol (e.g., betamercaptoethanol), an alkylthioglycolate, such as isooctylthioglycolate, (optionally and preferably) betamercaptoethyloleate, and sodium sulfide.

The present invention is further understood by the Examples which follow.

EXAMPLE 1

This illustrates synthesis of the alyltin stabilizer composition of the present invention which serves as an intermediate suitable for blending with other alkyltin compositions.

a suitable reactor equipped with an agitator, thermometer, and condenser was charged with 500 parts by weight of water, 84 parts by weight of butyltin trichloride, 71.8 parts by weight of 50 wt % aqueous sodium hydroxide, and 70 parts by weight of betamercaptoethanol. Sodium hydroxide (50 wt % in water) was slowly added to adjust the pH to 6.0 to 6.5.

To the resulting mixture was then charged 135 parts by weight of isooctylthioglycolate, 60.3 parts by weight of butyltin trichloride, and 52.8 parts by weight of 50 wt % aqueous sodium hydroxide. The pH of the resulting composition was similarly adjusted to 6.0–6.5 by addition of 50 wt % sodium hydroxide.

Then, 270 parts by weight of betamercaptoethyloleate, 65.5 parts by weight of butyltin trichloride, and 55.8 parts by weight of 50 wt % sodium hydroxide was added to the resulting composition. The pH was adjusted to 6.0 to 6.5 as previously described.

To the resulting composition was added 150 parts by weight butyltin trichloride and 100.3 parts by weight of sodium sulfide was slowly added. The Ph was adjusted to 6.0 to 6.5 by the addition of sodium sulfide. Then, a final charge of the same amounts of butyltin trichloride and sodium sulfide were added along with pH adjustment as just described.

The resulting mixture was heated to 70° C. and held at that temperature for thirty minutes. The product was allowed to phase separate with the lower product layer being returned to the reactor. The reactor contents were stripped at a reduced pressure of 30 mm Hg and a temperature of 90°–95° C. A final addition of 25 parts by weight of tripropylene glycol was made. The remaining liquid product was then filtered through a diatomaceous silica filter aid (SPEEDEX brand) to yield a clear, light amber, mobile liquid having the following composition:

| Component | Weight % |
| --- | --- |
| Monobutyltin tris(betamercaptoethanol) | 14.0 |
| Monobutyltin tris(isooctylthioglycolate) | 20.0 |
| Monobutyltin tris(betamercaptoethyloleate) | 33.4 |
| Monobutyltin sulfide | 27.4 |
| Mercaptoethyloleate | 2.3 |
| Tripropylene glycol | 2.9 |
| | 100.0 |

EXAMPLE 2

This illustrates synthesis of another embodiment of an the alkyltin stabilizer intermediate composition of the present invention.

A suitable reactor equipped with an agitator, thermometer, and condenser was charged with 500 parts by weight of water, 84 parts by weight of butyltin trichloride, 71.8 parts by weight of 50 wt % aqueous sodium hydroxide, and 70 parts by weight of betamercaptoethanol. Sodium hydroxide (50 wt % in water) was slowly added to adjust the pH to 6.0 to 6.5.

To the resulting mixture was then charged 135 parts by weight of isooctyl thioglycolate, 60.3 parts by weight of butyltin trichloride, and 52.8 parts by weight of 50 wt % aqueous sodium hydroxide. The pH of the resulting composition was similarly adjusted to 6.0–6.5 by addition of 50 wt % sodium hydroxide.

Then, 270 parts by weight of betamercaptoethyloleate, 65.5 parts by weight of butyltin trichloride, and 55.8 parts by weight of 50 wt % sodium hydroxide was added to the resulting composition. The pH was adjusted to 6.0 to 6.5 as previously described.

To the resulting composition was added 150 parts by weight butyltin trichloride and 100.3 parts by weight of sodium sulfide was slowly added. The pH was adjusted to 6.0 to 6.5 by the addition of sodium sulfide. Then, a final charge of similar amounts of butyltin trichloride and sodium sulfide were added along with pH adjustment as just described.

The resulting mixture was heated to 70° C. and held at that temperature for thirty minutes. The product was allowed to phase separate with the lower product layer being returned to the reactor. The reactor contents were stripped at a reduced pressure of 30 mm Hg and a temperature of 90°–95° C. A final addition of 25 parts by weight of tripropylene glycol was made. The remaining liquid product was then filtered through a diatomaceous silica filter aid (SPEEDEX brand) to yield a clear, light amber, mobile liquid having the following composition:

| Component | Weight % |
| --- | --- |
| Monobutyltin tris(betamercaptoethanol) | 13.6 |
| Monobutyltin tris(isooctylthioglycolate) | 41.1 |
| Isooctylthioglycolate | 10.8 |
| Monobutyltin sulfide | 18.7 |
| Butylated Hydroxy Toluene | 7.9 |
| Tripropylene glycol | 7.9 |
| | 100.0 |

EXAMPLE 3

This Example illustrates the performance of the alkyltin stabilizer compositions of Examples 1 and 2 in two polyvinyl chloride-resin containing test compounds.

The following PVC-resin containing compounds were made by processing the materials given below as follows: the resin and process aids were blended at room temperature in a Hobart mixer. The remaining components were added while mixing at room temperature until a homogeneous mixture was achieved.

| Sample A | |
| --- | --- |
| Ingredient | Parts by Weight |
| PVC resin (Rel. Visc. = 2.0) | 100.0 |
| Methacrylate-butadiene-styrene process aid (KANE ACE B22 brand) | 8.0 |
| Methylmethacrylate-ethyl acrylate process aid (PARALOID K-120N brand) | 2.0 |
| Epoxidized Soyabean Oil | 1.5 |
| Stabilizer* | 1.4 |
| Glyceryl monostearate | 0.75 |
| Montan ester wax | 0.3 |

*The stabilizer comprised 78% of dibutyltin bis(isooctylthioglycolate), 15.8% of the composition of Example 1, and 6.2% of styrenated phenol antioxidant.

| Samples B and C | |
| --- | --- |
| Ingredient | Parts by Weight |
| PVC resin (Rel. Visc. = 2.5) | 100.00 |
| Calcium Carbonate | 12.0 |
| Methylmethacrylate-butyl acrylate impact modifier (PARALOID KM-334 brand) | 5.0 |
| Titanium dioxide | 2.0 |
| Paraffin (RHEOLUBE 315S brand) | 1.2 |
| Calcium stearate | 1.1 |
| Stabilizer** | 0.8 |
| Methylmethacrylate-ethyl acrylate process aid (PARALOID 120N brand) | 0.5 |

**The stabilizer in Sample B comprised 80% of dibutyltin bis(isooctylthioglycolate), 14.5% of the composition from Example 2, and 5.5% of styrenated phenol. The stabilizer in Sample C comprised 80% of dibutyltin bis(isooctylthio-glycolate), 14.5% of the composition from Example 2, 3.2% of styrenated phenol, and 2.0% of epoxidized soyabean oil.

Samples A–C were tested, along with a control in which 0.8% of a commercially available alkyltin stabilizer was used with the other ingredients forming Sample A (with the exception of the stabilizer composition), for dynamic heat stability. The testing was done on a BRABENDER PLASTOGRAPH apparatus at 150° C. and 70 rpm. Sixty-five grams of sample was used and triangular sample chips were removed at five minute intervals until a black color was noted and degradation was noticed as evidenced by a significant increase in torque on a Brabender torque rheometer. The results are as follows:

| Sample | Time to Initial Color (min) | Time to Degrade (min) |
|---|---|---|
| Control | 10 | 34 |
| A* | 15 | 34 |
| B** | 15 | 34 |
| C** | 20 | 34 |

*Contains the stabilizer of Example 1.
**Contains the stabilizer of Example 2.

Resin not containing any stabilizer would be expected to turn black in less than five minutes and would be expected to dedgrade after about ten minutes.

The foregoing Examples should not be construed in a limiting sense since they merely represent certain preferred embodiments of the present invention. The scope of protection sought is set forth in the claims which follow.

We claim:

1. An organotin stabilizer mixture comprising:
   (a) a monoalkyltin mercaptoalcohol of the formula $RSn(SR'OH)_3$, wherein R is lower alkyl and R' is lower alkylene.
   (b) a monoalkyltin mercaptoacid ester of the formula $RSn(SR'CO_2R'')_3$, where R is lower alkyl, R' is lower alkylene, and R'' is $C_6$ to $C_{10}$ alkyl, and
   (c) a monoalkyltin sulfide which comprises a lower alkyl group.

2. A mixture as claimed in claim 1 where R is butyl and R' is ethylene.

3. A mixture as claimed in claim 1 wherein R is butyl, R' is methylene, and R'' is isooctyl.

4. A mixture as claimed in claim 1 wherein the lower alkyl group is butyl.

5. A mixture as claimed in claim 1 which further comprises a monoalkyltin mercaptoalcohol ester.

6. A mixture as claimed in claim 5 wherein the ester is of the formula $RSn(SR'O_2CR'')_3$, where R is lower alkyl, R' is lower alkylene, and R'' is $C_{12}$ to $C_{20}$ alkyl.

7. A mixture as claimed in claim 6 wherein R is butyl, R' is ethylene, and R'' is oleyl.

8. A mixture as claimed in claim 1 which comprises:
   (a) 10% to 20%, by weight of (a);
   (b) 35% to 45%, by weight of (b); and
   (c) 15% to 25%, by weight of (c).

9. A mixture as claimed in claim 8 wherein (a) is monobutyltin tris(betamercaptoethanol), (b) is monobutyltin tris(isooctylthioglycolate), and (c) is monobutyltin sulfide.

10. A mixture as claimed in claim 1 which comprises:
    (a) 10% to 20%, by weight of (a);
    (b) 15% to 25%, by weight of (b);
    (c) 25% to 35%, by weight of (c); and
    (d) 30% to 40%, by weight of a monoalkyltin mercaptoalcohol ester.

11. A mixture as claimed in claim 10 wherein the ester (d) is of the formula $RSn(SR'O_2CR'')_3$, where R is lower alkyl, R' is lower alkylene, and R'' is $C_{12}$ to $C_{20}$ alkyl.

12. A mixture as claimed in claim 10 wherein (a) is monobutyltin tris(betamercaptoethanol), (b) is monobutyltin tris(isooctylthioglycolate), (c) is monobutyltin sulfide, and (d) is monobutyltin tris(betamercaptoethyloleate).

* * * * *